United States Patent
Hellmann et al.

(10) Patent No.: US 6,615,127 B2
(45) Date of Patent: Sep. 2, 2003

(54) METHOD AND DEVICE FOR ADAPTIVE CONTROL OF SEPARATION DISTANCE AND/OR DRIVING SPEED OF A MOTOR VEHICLE

(75) Inventors: Manfred Hellmann, Hardthof (DE); Hermann Winner, Karlsruhe (DE); Ralph Lauxmann, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/834,481

(22) Filed: Apr. 13, 2001

(65) Prior Publication Data

US 2001/0032048 A1 Oct. 18, 2001

(30) Foreign Application Priority Data

Apr. 17, 2000 (DE) .......................................... 100 19 190

(51) Int. Cl.[7] ............................................. B60K 31/00
(52) U.S. Cl. ............................. 701/96; 701/93; 701/94; 180/170; 180/175; 180/178
(58) Field of Search ............................. 701/93, 94, 96; 180/170, 175, 178

(56) References Cited

U.S. PATENT DOCUMENTS

| | | | | |
|---|---|---|---|---|
| 5,396,426 A | * | 3/1995 | Hibino et al. ............... | 123/352 |
| 5,400,864 A | * | 3/1995 | Winner et al. ............... | 180/169 |
| 5,495,251 A | * | 2/1996 | Gilling et al. ............... | 180/167 |
| 5,731,977 A | * | 3/1998 | Taniguchi et al. ........... | 180/169 |
| 5,794,735 A | * | 8/1998 | Sigl ........................... | 180/170 |
| 5,839,534 A | * | 11/1998 | Chakraborty et al. ........ | 180/169 |
| 5,938,714 A | * | 8/1999 | Satonaka ..................... | 180/169 |
| 5,955,941 A | * | 9/1999 | Pruksch et al. ............. | 180/167 |
| 5,969,640 A | * | 10/1999 | Timm et al. ................. | 180/169 |
| 6,009,368 A | * | 12/1999 | Labuhn et al. .............. | 123/352 |
| 6,049,739 A | * | 4/2000 | Melvin ........................ | 700/37 |

OTHER PUBLICATIONS

Winner et al.; Adaptive Cruise Control System Aspects and Development Trends; Feb. 26–29, 1996; pp. 27–36.

* cited by examiner

Primary Examiner—Michael J. Zanelli
Assistant Examiner—Eric M Gibson
(74) Attorney, Agent, or Firm—Kenyon & Kenyon

(57) ABSTRACT

A method and device for adaptive control of separation distance and/or driving speed of a motor vehicle, at least in a first operational mode an engine of the motor vehicle and in a second operational mode a brake of the motor vehicle being able to be activated as a function of a magnitude, representing an acceleration, the magnitude representing the setpoint acceleration is formed and/or limited at least as a function of at least one base value.

12 Claims, 1 Drawing Sheet

METHOD AND DEVICE FOR ADAPTIVE CONTROL OF SEPARATION DISTANCE AND/OR DRIVING SPEED OF A MOTOR VEHICLE

FIELD OF THE INVENTION

The present invention relates to a method and a corresponding device for adaptive control of separation distance and/or driving speed of a motor vehicle. Control systems of the specific type are, for example, also known as adaptive cruise control systems (ACC systems).

BACKGROUND INFORMATION

An ACC system based on radar is known from SAE Technical Paper Series 961010, International Congress and Exposition, Detroit, Feb. 26–29, 1996, "Adaptive Cruise Control System—and Development Trends", Winner, Witte, Uhler, Lichtenberg, Robert Bosch GmbH. In this version, the multi-purpose enabled radar sensor is mounted at the front end of a motor vehicle for determining separation distances from, and relative speeds to vehicles driving ahead. The data ascertained from the radar system are conducted to a control unit via a bus system. On the basis of the transmitted radar data and the driver input, the control unit determines an appropriate acceleration requirement, which, in turn, is transmitted to a longitudinal control unit. The longitudinal control unit activates activators depending on the acceleration requirement of the control unit. These actuators can be the motor vehicle engine, the clutch, or the motor vehicle brakes. Activation of the actuators results in such specific motor vehicle performance characteristics, which, in turn, are fed back to the control unit, thus forming a control loop. Depending on which acceleration requirement is involved, either the drive train or the brakes is/are activated. In making this selection, the gradient of the road is taken into consideration. In addition, the boundary properties, or rather the physical limitations of the drive train must be known or calculated accordingly.

SUMMARY OF THE INVENTION

A method for adaptive control of separation distances and/or driving speeds of a motor vehicle, at least in a first operational mode, an engine (14) of the motor vehicle and, in a second operational mode, a brake (14) of the motor vehicle being able to be activated as a function of a quantity (aSoll) (aSetpoint), representing an acceleration, is further refined in that the quantity (aSoll) representing the setpoint acceleration is formed and/or limited at least as a function of at least one basic value (aBaseMax, aBaseMin). A preferred embodiment provides that the change over time of the magnitude (aSoll) representing the setpoint acceleration can be limited in a positive and in a negative direction as a function of determinable boundary values (aMinus, aPlus), it being further advantageous that, during the restriction of the magnitude (aSoll), representing the characteristic acceleration, the cycle time (dt) of a control device (10) and/or a regulator (13) are taken into consideration. (aMinus and aPlus represent time derivatives of accelerations, which is not immediately recognizable in the illustration used in this text).

The method according to the present invention prevents "vehicle judder" quite effectively during the activation of the engine control and the brake (subsystems, in this case). By adding/subtracting a certain amount to/from the basic values, one achieves a jerk-free change in acceleration. Here, a jerk is understood to mean the change in time of the acceleration. It is especially advantageous that external and internal acceleration requirements can be converted by selecting base values to this effect. In the same manner, for instance, hystereses and non-settable ranges in the subsystems can be realized by defining base values, without the need for costly/additional special treatment for these operating states.

A device for adaptive control of separation distance and/or driving speed of a motor vehicle is developed further, compared to the related art, in that the means for carrying out the abovementioned method is provided.

DETAILED DESCRIPTION

Figure 1:
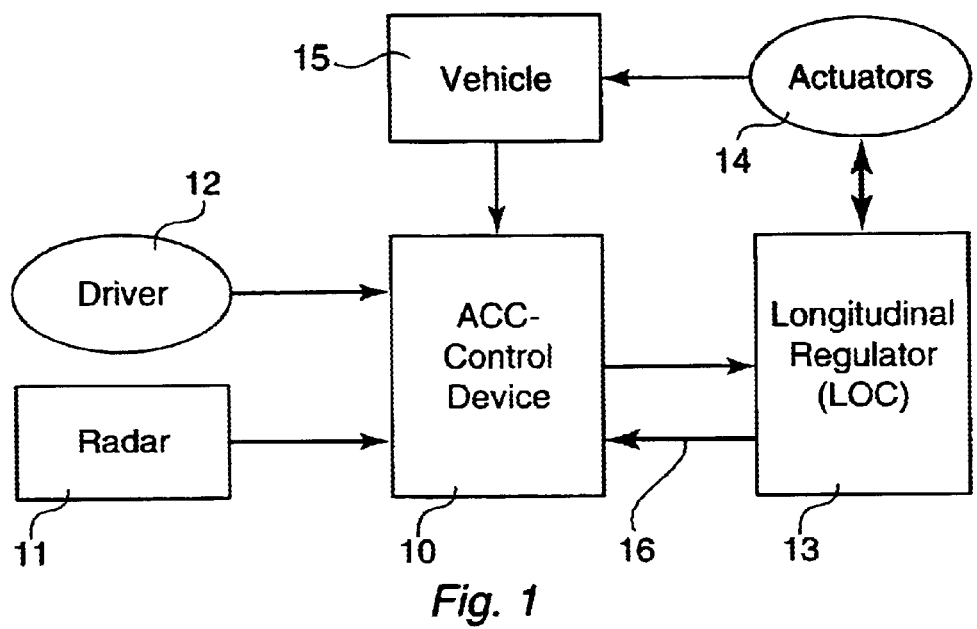
FIG. 1 shows a control loop of a system for adaptive separation distance and/or driving speed control for carrying out the method according to the present invention.

FIG. 1 shows an adaptive separation distance and/or driving speed control for a motor vehicle. In it, a central control unit (10) (ACC controller, ACC control device) represents the central point of the control system. Speed and separation distance data on vehicles driving ahead are transmitted by a radar sensor to control unit 10. The radar system 11 illustrated here, based on high frequency microwave radiation, can, however, also be designed as a LIDAR, or infrared sensor. With respect to radar technology, the method according to the present invention is not limited to an FMCW radar, but can also be applied, for instance, in connection with a system working on the impulse radar principle. The speed data of vehicles driving ahead (and also those of other detected objects, e.g. stationary objects at the side of the road), which are transmitted from the radar unit 11 to control unit 10, are relative speed values with reference to one's own vehicle. Additionally, the driver 12 of the motor vehicle transmits signals to control unit 10. These signals can be, for example, gas pedal positions, brake interventions, steering movements, but also operating functions for the ACC system. From the data delivered by the driver 12 and the radar unit 11, the control unit 10 determines an acceleration requirement which is transmitted to a longitudinal control (unit) 13 (LOC). The longitudinal control unit 13 is there for the purpose of transposing the acceleration requirements transmitted by control unit 10 into the corresponding activating signals for the actuators 14. The actuators 14 can generally be accelerating or decelerating means. Throttle valve control would be conceivable, for example, as accelerating means, while an intervention in the (active) brake system might be regarded as a decelerating means. Depending on the activation of the actuators 14, a corresponding driving behavior of the vehicle 15 results. These actual vehicle condition data are transmitted from the vehicle 15 to control unit 10.

According to the present invention, the determined base values aBaseMax and aBaseMin are conducted/fed back by longitudinal control unit 13 to the ACC control unit 10, which is illustrated in FIG. 1 by feedback 16. The base values aBaseMax and aBaseMin are formed in the longitudinal control unit 13 based on the base values transmitted by the actuators 14 (engine control or active brake/deceleration control)−(aBaseHystMax/aBaseHystMin).

For reasons of comfort and safety, the vehicle acceleration (and thus the setpoint acceleration aSoll) should not be changed by arbitrary leaps, but rather, the jerk (defined as the change of the acceleration with time) is limited in the positive and the negative direction by the boundary values, e.g. aMinus and aPlus. Therefore, a new setpoint acceleration is limited in the ACC controller according to the equation aSoll=MAX (aBaseMin–aMinus·dt, MIN(aSoll, aBaseMax+ aPlus·dt)), with dt standing for the cycle time of longitudinal controller 13, and aBaseMin or aBaseMax for the base values, by which the reference point for the jerk limitation is determined.

These base values aBaseMin or aBaseMax take into consideration the following disturbance variables:

Depending on the motorization, desired acceleration setpoint values may not be attainable (gradient, gear). Therefore, a continuous increase in the setpoint value does not have the desired effect, but, on the contrary, leads to a later reduction in the acceleration taking longer. The base values aBaseMin or aBaseMax are adapted appropriately to the gradient or gear setting, respectively.

There are acceleration regions which cannot be reached (thrust moment, minimal injection quantity). For this, a "deliberate" selection of the setpoint acceleration by the ACC control should become possible. To do this, the base values aBaseMin or aBaseMax are set to special applicable acceleration values or to values transmitted by the engine control.

Hystereses are used in the brake control, for reasons of comfort. As a result, changes in setpoint values first take effect when the change moves beyond the hysteresis region. Thus, in forming the base values aBaseMin or aBaseMax the hysteresis region is given consideration.

At the transition to brake control a starting hysteresis is inserted for the protection of the brake system and to reduce flickering of the brake lights. Thus, in forming the base values aBaseMin or aBaseMax the starting hysteresis is given consideration.

For this reason, calculation of a new ACC setpoint value (aSoll) is made not only on the basis of the old setpoint value (aSollAlt), but the LOC (longitudinal control) puts a pair of values, aBaseMin/aBaseMax, at the disposal of the ACC controller 10. The two values are defined as follows:

The base value aBaseMax is that value, which a setpoint acceleration aSoll, specified by the ACC controller 10, at least has to exceed for a positive acceleration change of the vehicle 15 to appear.

And, correspondingly:

The base value aBaseMin is that value, which a setpoint acceleration aSoll, specified by the ACC controller 10, at least has to fall below for a negative acceleration change of the vehicle 15 to appear.

For calculating the base values aBaseMax and aBaseMin a control flag BrakeByACC is first formed. This flag BrakeByACC is set when a braking requirement from the ACC system is present (DCEnable=1). The flag BrakeByACC controls the formation of the basis value. Once it is set, the base values aBaseMin and aBaseMax are calculated from the old setpoint value aSollAlt and the reference acceleration and additionally from the actual motor momentum. The formation of BrakeByACC requires a Timer BrakeForceDelayTimer having an applicable time duration. This is started by setting DCEnable (control of the active brake: DCEnable=1). As long as the flag DCEnable is set to (DCEnable=1), activation of the driving mechanism is blocked.

Within the running time of BrakeForceDelayTimer, the delay controller, or rather the active brake, has time to react with the cancellation of BrakeForce. The signal BrakeForce is a signal which is generated independently of the active brake or the delay controller, for instance in the framework of measuring or estimating the braking pressure. The signal BrakeForce is set to 1 as soon as a delaying effect of the brake system is present, or stays at zero as long as essentially no delaying effect of the brake system is present. As long as BrakeForce remains set, switching back to the drive branch does not occur.

Case 1 (Normal Case)

Figure 2:
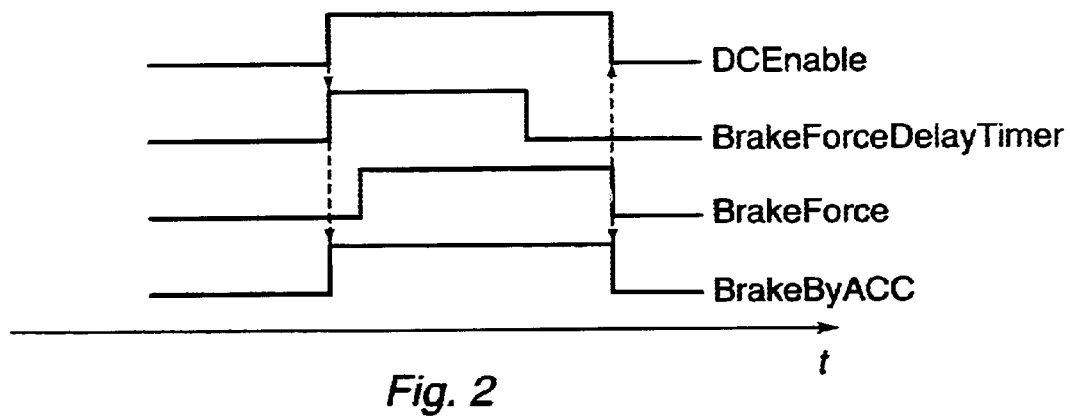
FIG. 2 shows a first exemplary embodiment for determining base values.

FIG. 2 shows this case: After activation of the active brake (DCEnable=1), the latter reacts with a short time delay by setting the flag BrakeForce, thus the flag BrakeForce is set, with a short time delay, to 1 (generally to high level). The time delay shown is caused by the fact that pressure first has to be built up in the active brake. The BrakeForceDelay timer is started by setting DCEnable, and runs for an applicable time. Along with the starting of the timer, the control flag BrakeByACC is also set.

Case 2 (BrakeForce is Not Set by the Active Brake)

Figure 3:
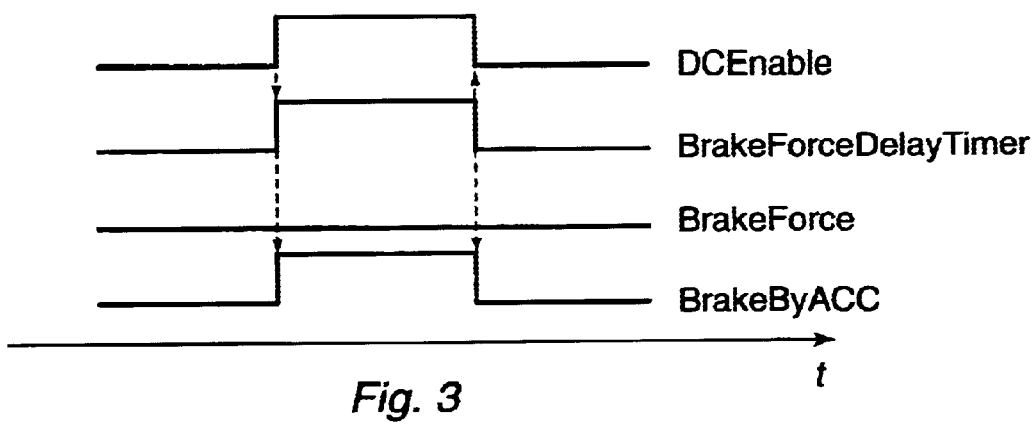
FIG. 3 shows a further exemplary embodiment for determining base values.

FIG. 3 shows this case: In rare cases it can happen that the active brake or the delay controller does not react to an ACC requirement (DCEnable=1) by a buildup of brake pressure. This can happen, for example, when the ACC setpoint value (aSoll) differs only barely from the acceleration value (aSchlepp) resulting from the engine torque moment, but the minimum value hystereses of the active brake are not exceeded. In this case, after expiration of the BrakeForceDelay timer the switching possibility to the drive is released again, and DCEnable is reset to zero.

Rules for the formation of the base values aBaseMax and aBaseMin are described below:

1. During active control (that is to say, in the ActiveControl mode), i.e. in the active control operation of the ACC system, the base values aBaseMin and aBaseMax are formed, in the activation case, from the actual base value aBaseAct and the last setpoint value aSollAlt:

aBaseMin=MAX(MIN(aBaseAct, aSollAlt), aBaseAct–aBaseDiff), aBaseMax=MIN( MAX(aBaseAct, aSollAlt), aBaseAct+aBaseDiff).

Here, the applicable variable aBaseDiff represents the maximum allowable deviation between the base values aBaseMin and aBaseMax.

2. During all transitions into the drive case or in the ActiveControl mode, the base values aBaseMin and aBaseMax are initialized to the actual base value aBaseAct:

aBaseMin=aBaseMax=aBaseAct.

Thus, the base values aBaseMin and aBaseMax, at initialization and/or at transition into the active separation distance and/or driving speed control mode are set to an initial value (aBaseAct), which is determined at least on the basis of an engine momentum actual value (first drive mode) or of a charge actual value (second drive mode) as well as of an estimated gradient coefficient of the road of the motor vehicle. Further influential quantities in this matter are estimated driving resistances (e.g. friction, air resistance, etc.) and consideration of the gear ratio.

3. During control by braking intervention (activating the active brake or the delay regulator), the base values aBaseMin and aBaseMax are formed from the base values aBaseHystMax and aBaseHystMin, prepared by the delay regulator, and the last setpoint value aSollAlt:

aBaseMin=MAX(MIN(aBaseHystMin, aSollAlt), aBaseHystMin−aBaseDiff), aBaseMax=MIN(MAX(aBaseHystMax, aSollAlt), aBaseHystMax+aBaseDiff).

Alternatively, the base values aBaseMin and aBaseMax can be determined on the basis of the old acceleration setpoint value aSollAlt, as long as the feedback values aBaseHystMax and aBaseHystMin are not made available by the delay regulator or the active brake.

aBaseMin=aBaseMax=aSollAlt.

4. If the setpoint value aSoll lies below the minimum acceleration of the driving mechanism, but the braking intervention has not yet been activated, at aBaseMin, a brake activation hysteresis value aBrakeHyst is deducted from a minimum acceleration value aMin.

aBaseMax=aMin, aBaseMin=aMin−aBrakeHyst.

In this connection, the minimum acceleration aMin is that acceleration, which can only be reached by the drag torque (aSchlepp) maximally possible in the actual engine condition. The minimum acceleration aMin is calculated on the basis of the momentum or friction momentum loss, or the corresponding charge, and the estimated gradient coefficient. This quantity is used for the decision as to whether a change of drive control should take place after brake activation. Furthermore, it is applied as minimum delay within the control framework, so that there is no downward limitation of the setpoint value in the region of the acceleration region representable by the driving mechanism.

The brake activating hysteresis value aBrakeHyst is used for avoiding hunting around the region of the minimum acceleration and avoidable brake activations. The brake activating hysteresis value aBrakeHyst must be undershot at the change into brake activation before the braking branch will be allowed. The change only takes place when the setpoint value lies below (aMin−aBrakeHyst). In order to prevent too strong a time delay of braking intervention, the hysteresis is reduced proportional to time and (aSoll−aMin).

5. When the driver of the motor vehicle calls for a greater engine output than ACC:

aBaseMax=aBaseAct, aBaseMin=aDrvMin.

The magnitude aDrvMin, here, is defined as the drag torque delay of the motor vehicle.

Consideration of the old setpoint values (1. and 3.) prevents blocking a regulation change through erroneously determined thresholds. That is why the maximum deviation aBaseDiff between the values should be selected substantially larger than the value of the permissible maximum acceleration change per time step.

What is claimed is:

1. A method for an adaptive control of at least one of a separation distance and a driving speed of a motor vehicle, comprising:

at least one of forming and limiting a setpoint acceleration value as a function of at least one base value;

activating an engine of the vehicle in a first operational mode and a brake of the vehicle in a second operational mode, as a function of the setpoint acceleration value; and determining the at least one base value, in a second drive mode, as a function of (a) a feedback base value from at least one of a delay regulator and an active brake and (b) a last value representing a setpoint acceleration.

2. The method according to claim 1, further comprising limiting a change over time of the setpoint acceleration value in a positive direction and a negative direction as a function of determinable boundary values.

3. A method for an adaptive control of at least one of a separation distance and a driving speed of a motor vehicle, comprising:

at least one of forming and limiting a setpoint acceleration value as a function of at least one base value;

activating an engine of the vehicle in a first operational mode and a brake of the vehicle in a second operational mode, as a function of the setpoint acceleration value; and limiting a change over time of the setpoint acceleration value in a positive direction and a negative direction as a function of determinable boundary values, wherein the setpoint acceleration value is limited as a function of a cycle time of at least one of a control unit and a regulator.

4. The method according to claim 3, wherein the setpoint acceleration value is determined from the following relationship:

aSoll=MAX(aBaseMin−aMinus·dt, MIN(aSoll, aBaseMax+aPlus·dt)).

5. The method according to claim 3, further comprising setting the at least one base value to an initial value at at least one of an initialization and a transition into an active separation distance/driving speed control mode, the initial value being a function of at least one of an engine momentum actual value, a charge actual value, and an estimated gradient coefficient of a road for the vehicle.

6. The method according to claim 3, further comprising determining the at least one base value, in a first drive mode, as a function of an actual base value and a last value representing a setpoint acceleration.

7. The method according to claim 3, further comprising:

determining the at least one base value in accordance with at least one of a plurality of functions.

8. The method according to claim 7, further comprising:

selecting the at least one of the plurality of functions based on an operation mode of the motor vehicle.

9. The method according to claim 3, further comprising:

determining the at least one base value at least on the basis of a hysteresis occurring in an operation mode of the motor vehicle.

10. The method according to claim 9, wherein:

the operation mode is a brake control of the motor vehicle.

11. A device for an adaptive control of at least one of a separation distance and a driving speed of a motor vehicle, comprising:

means for at least one of forming and limiting a setpoint acceleration value as a function of at least one base value;

means for activating an engine of the vehicle in a first operational mode and a brake of the vehicle in a second operational mode, as a function of the setpoint acceleration value; and limiting a change over time of the setpoint acceleration value in a positive direction and a negative direction as a function of determinable boundary values, wherein the setpoint acceleration value is limited as a function of a cycle time of at least one of a control unit and a regulator.

12. A device for an adaptive control of at least one of a separation distance and a driving speed of a motor vehicle, comprising:

means for at least one of forming and limiting a setpoint acceleration value as a function of at least one base value;

means for activating an engine of the vehicle in a first operational mode and a brake of the vehicle in a second operational mode, as a function of the setpoint acceleration value; and means for determining the at least one base value, in a second drive mode, as a function of (a) a feedback base value from at least one of a delay regulator and an active brake and (b) a last value representing a setpoint acceleration.

* * * * *